J. P. WRIGHT.
MECHANISM FOR DIVIDING LAMINATED MATERIAL.
APPLICATION FILED NOV. 24, 1914.
1,248,588.
Patented Dec. 4, 1917.
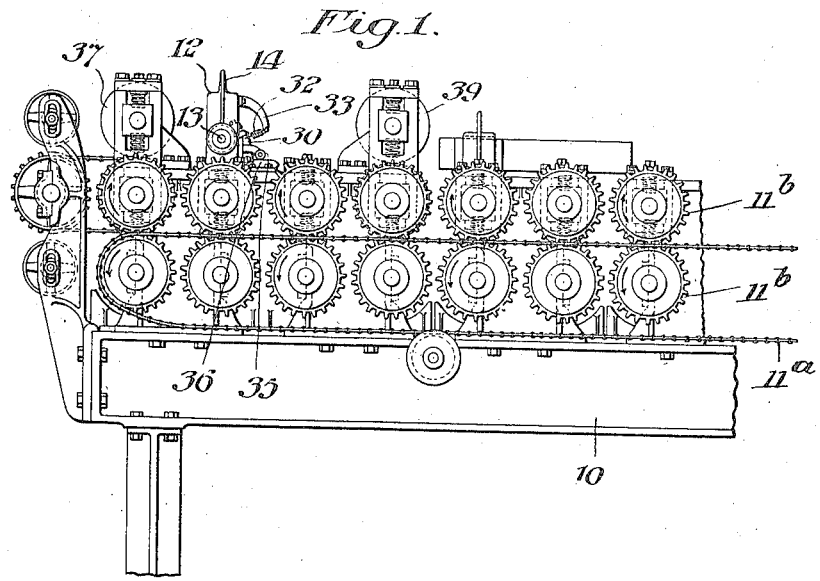
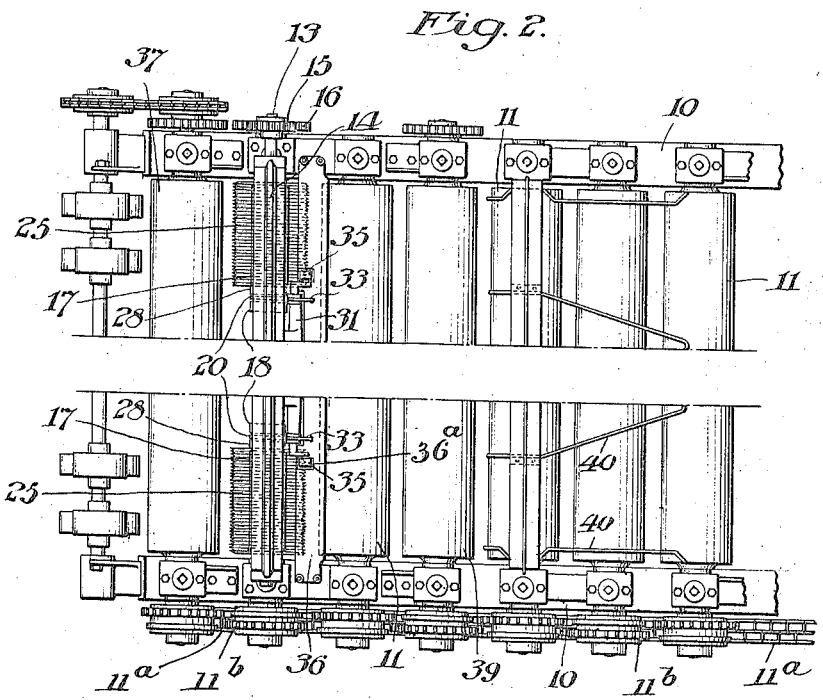

J. P. WRIGHT.
MECHANISM FOR DIVIDING LAMINATED MATERIAL.
APPLICATION FILED NOV. 24, 1914.
1,248,588.
Patented Dec. 4, 1917.
2 SHEETS—SHEET 2.
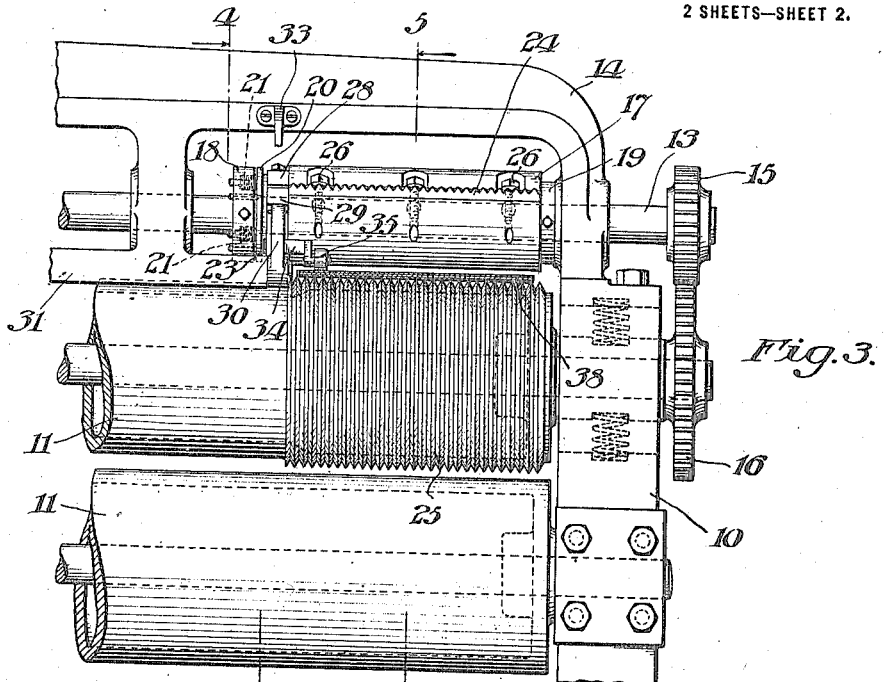
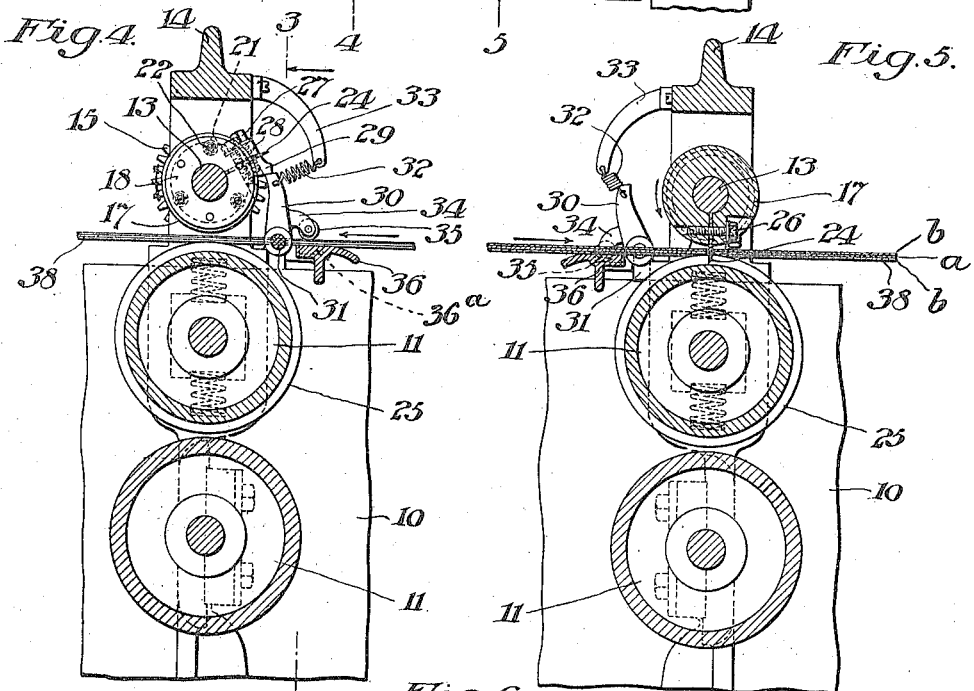
Witnesses:
Inventor:
Jacob P. Wright,
by John R. Nolan
Attorney.

UNITED STATES PATENT OFFICE.

JACOB P. WRIGHT, OF BARBERTON, OHIO, ASSIGNOR TO THE DIAMOND MATCH COMPANY, OF CHICAGO, ILLINOIS, A CORPORATION OF ILLINOIS.

MECHANISM FOR DIVIDING LAMINATED MATERIAL.

1,248,588.   Specification of Letters Patent.   Patented Dec. 4, 1917.

Application filed November 24, 1914. Serial No. 873,677.

*To all whom it may concern:*

Be it known that I, JACOB P. WRIGHT, a citizen of the United States, and resident of Barberton, in the county of Summit and State of Ohio, have invented certain new and useful Improvements in Mechanism for Dividing Laminated Material, of which the following is a specification.

This invention relates to machines for making sectional sheet material, having reference more especially to machines whereby a continuous series of strips of rigid material, such as veneer, in end spaced relation to each other, are lined or coated on their respective sides with frangible fabric, such as thin paper, and the thus lined and connected strips are successively separated from each other by incising or severing the lining transversely through the junction spaces between the strips.

My invention particularly concerns the dividing or severing of the laminated material, and it has for its object to provide for this purpose a novel mechanism under the control of the traveling material, which mechanism combines simplicity and durability of construction with certainty and precision of operation, as will be hereinafter described and claimed.

In the drawings—

Figure 1 is a side elevation, of a portion of a veneer and paper laminating machine equipped with a dividing or severing mechanism embodying the preferred form of my invention.

Fig. 2 is a plan of Fig. 1, showing feeding and severing mechanisms for a plurality of webs of material traveling abreast.

Fig. 3 is an elevation of the severing mechanism and adjuncts, showing the parts in the position which they occupy when the cutter head is locked.

Fig. 4 is a vertical section, as on the line 4—4 of Fig. 3.

Fig. 5 is a vertical section, as on the line 5—5 of Fig. 3, but showing the cutter head as unlocked and the cutter thereof as severing the web.

Fig. 6 is a longitudinal section, enlarged, of a portion of the sectional sheet material.

10 designates a part of the main frame of the machine; and 11 upper and lower rows of hollow drying rolls suitably journaled in bearings on the frame and respectively driven in the directions indicated by the adjacent arrows, preferably through the agency of a positively-driven double sprocket chain 11$^a$ which co-acts with suitably-disposed intermeshing wheels 11$^b$ on the shafts of the rolls.

The improved dividing or severing mechanism is arranged at the rear of the machine in operative relation to the upper rolls.

The web of material, comprising, for example, strips of veneer (*a*) endwise separated and coated on their upper and lower sides with thin paper (*b*), travels along the upper drying rolls to and through the cutting mechanism and is progressively divided by the latter into sections lengthwise defined by the frangible junction spaces (*c*) between succeeding strips of veneer. (See Fig. 6). These sections are delivered to a belt at the rear of the machine and thereby carried rearward, thence they are returned by the belt to and fed between the upper and lower rolls which thereupon in their rotation, as indicated, carry the sections forward to a convenient point of discharge. As the belt just mentioned may be of any known or approved character it is deemed unnecessary to show or describe the same.

Referring particularly to the form of severing mechanism herein illustrated, 13 designates a shaft which is journaled in bearings in a bridge frame 14 which spans the main frame. The shaft 13, which is arranged directly above and parallel to the shaft of one of the drying rollers 11, at the rear of the machine, is provided with a gear wheel 15 in mesh with a gear wheel 16 on the shaft of the adjacent drying roller, the shaft 13 thus being positively driven. A cutter head or support 17 is loosely mounted between two spaced collars 18, 19 fast on the shaft. Between the collar 18 and the opposing end of the head 17 is a ring 20 which is yieldingly forced toward the head by means of compression springs 21 encircling ring-guide pins 22 in the collar 18, a washer 23 being preferably interposed between the collar and the head. Thus the head has a friction or slip connection with its shaft.

The head 17 is split longitudinally to receive a thin cutter blade 24 which extends from end to end of the head and which blade in length slightly exceeds the width of the sheet material to be severed. The outer or acting edge of the blade is preferably serrated or saw toothed as shown, and the periphery of the underlying roller 11 is also preferably formed with continuous tooth-like serrations as at 25 so that the respective toothed surfaces will mesh or register with each other at any position of travel of the roller when the cutter is swung down into action, as will be presently explained. The cutter blade is secured to its supporting head by bolts 26, the holes for which in the blade are elongated in order that the blade may be longitudinally adjusted on the head to insure proper registry of the teeth of the blade with the circumferential grooves of the proximate lower roller 11.

On one end of the head 17 is adjustably secured by means of a clamp-screw 27 a split collar 28 which is provided with a radial projection 29 into and from the rotary path of which is movable a stop pawl 30 pivoted to a bracket on the frame 31. The pawl is normally held beyond the path of the projection by means of a retracting spring 32 which is secured to the pawl and to an arm 33 fast on the frame. Formed on or secured to the pawl is a foot 34 which overhangs the path of and bears upon the upper surface of the laminated web, such foot being preferably provided with an anti-friction roller 35, and a suitable backer bar 36 for the web being arranged beneath the roller and being provided with a suitable cavity 36ᵃ thereunder. When this roller is bearing upon the stable portion of the web the nose of the pawl is held, in opposition to the action of the spring, in the path of the stop 29, thereby through the slip connection described, preventing the cutter head from turning with the shaft 13. When, however, the junction space (c) between adjoining strips passes between the roller and the cavity in the bar 36 the spring 32 presses the roller into such space and thus retracts the pawl from the stop. Thereupon the cutter head and its cutter are rotated by and with the shaft, the movement of the cutter and the travel of the web being so coördinated that the cutter enters the portions of the paper between the adjoining ends of the successive veneer strips, the teeth of the cutter meshing with the grooved periphery of the underlying roller 25 which constitutes, in effect, a backer for the cutter. The saw-like teeth of the cutter are thus caused to penetrate and nearly sever the web in the spaces between successive strips of veneer, the periodical action of the cutter, as will be apparent, being automatically determined by the junction spaces between successive sections of material, irrespective of the uniformity or variableness in length of the sections.

Rearward of the cutter head is a roller 37 which is in contact or nearly so with the underlying drying roller. These two rollers are driven at a slightly higher surface speed than the traveling web (38), which progresses to and between the rollers after the web has been acted upon by the cutter, the increased tension on the web thereupon completely rupturing the latter across its weakened junction portion.

I preferably provide forwardly of the cutter head a feed roller 39 which coacts with the underlying drying roller to feed the web positively to the cutting path, suitable edge guide strips 40 for the web being conveniently supported immediately in advance of the feed roller.

I claim—

1. In a machine for severing a web composed of sections of veneer endwise separated and coated on their upper and lower sides with paper, a cutter for severing the paper through the spaces between succeeding sections, a support for said cutter, mechanism for operating said support, locking and releasing connections between said support and its operating mechanism, an element adjacent the cutter support for controlling the active and idle conditions of said connections, and means tending to press said element against the surface of the web, whereby when said element is riding upon the surface of the web overlying the veneer sections the said connections are idle and when said element rides upon the unsupported surfaces between succeeding sections said element is depressed and the connections rendered active.

2. In a machine for severing successively spaced and connected sections of sheet material, a cutter, a support therefor, a continuously driven element upon which said support is mounted, a friction drive connection between the said element and the support, and means for periodically interrupting the operation of said connection, said means including a controlling element adapted to ride upon and be positioned by the opposing surface of the stock.

3. In a machine for severing successively spaced and connected sections of sheet material, a cutter, a support therefor, a continuously driven shaft upon which said support is mounted, a friction drive connection between the shaft and the support, a projection on said support, a stop pawl adjacent the projection and means normally holding said pawl in the path of the projection, said pawl having a portion adapted to ride upon and be positioned by the opposing surface of the material.

4. In a machine for severing successively spaced and connected sections of sheet material, the combination with a roller having continuous teeth-like serrations around its periphery, of a cutter support above said roller, a cutter blade on said support having its functional edge serrated correspondingly with said roller, a continuously driven element upon which said support is mounted, a friction drive connection between the said element and the support, and means for periodically interrupting the operation of said connection, said means including a controlling element adapted to ride upon and be positioned by the opposing surface of the stock.

Signed at Barberton, in the county of Summit and State of Ohio, this 21st day of November, A. D. 1914.

JACOB P. WRIGHT.

Witnesses:
V. A. JOHNSTON,
E. A. JACOBS.

Copies of this patent may be obtained for five cents each, by addressing the "Commissioner of Patents, Washington, D. C."